US012769169B2

(12) United States Patent
Gschwender

(10) Patent No.: US 12,769,169 B2
(45) **Date of Patent: *Oct. 20, 2026**

(54) FUNCTIONAL LAYER AND METHOD FOR CONTACTING A FUNCTIONAL LAYER

(71) Applicant: Webasto SE, Stockdorf (DE)

(72) Inventor: Yannik Gschwender, Stockdorf (DE)

(73) Assignee: WEBASTO SE, Stockdorf (DE)

(*) Notice: Subject to any disclaimer, the term of this patent is extended or adjusted under 35 U.S.C. 154(b) by 89 days.

This patent is subject to a terminal disclaimer.

(21) Appl. No.: 18/634,031

(22) Filed: Apr. 12, 2024

(65) Prior Publication Data

US 2024/0353717 A1 Oct. 24, 2024

(30) Foreign Application Priority Data

Apr. 19, 2023 (DE) .................... 10 2023 109 863.2

(51) Int. Cl.
*G02F 1/1345* (2006.01)
*G02F 1/1333* (2006.01)
*G02F 1/1343* (2006.01)
*G02F 1/139* (2006.01)

(52) U.S. Cl.
CPC ...... *G02F 1/1345* (2013.01); *G02F 1/133345* (2013.01); *G02F 1/134327* (2013.01); *G02F 1/134363* (2013.01); *G02F 1/13439* (2013.01); *G02F 1/139* (2013.01)

(58) Field of Classification Search
USPC .................................................. 349/139, 142
See application file for complete search history.

(56) References Cited

U.S. PATENT DOCUMENTS 11,820,227 B2 * 11/2023 Spanjers ............. G02F 1/13439
2024/0361647 A1 * 10/2024 Gschwender .............. B60J 3/04

FOREIGN PATENT DOCUMENTS

DE 102019135413 A1 6/2021

OTHER PUBLICATIONS

Office Action issued against corresponding German Application No. 10 2023 109 863.2; mailed Nov. 22, 2023; In German with English Machine Translation (8 pages).

* cited by examiner

*Primary Examiner* — Dung T Nguyen
(74) *Attorney, Agent, or Firm* — Fitch, Even, Tabin & Flannery, LLP

(57) ABSTRACT

A functional layer includes a first backing film having a first electrically conductive coating, a second backing film having a second electrically conductive coating, and a liquid crystal array disposed between the two electrically conductive coatings. The first electrically conductive coating is exposed in a surface area and removed in the exposed surface area to form an insulation area to form at least a first segment and a second segment of the first electrically conductive coating, the first segment being electrically insulated from the second segment by the insulation area. A first electrically conductive conductor path extends from the first segment in the insulation area to a contact area. A first insulation layer is applied to the first electrically conductive conductor path and at least one second electrically conductive conductor path, which is applied to the first insulation layer, extends from the second segment to the contact area.

20 Claims, 3 Drawing Sheets

FUNCTIONAL LAYER AND METHOD FOR CONTACTING A FUNCTIONAL LAYER

CROSS-REFERENCE TO RELATED APPLICATION(S)

This application claims the benefit of German patent application no. 10 2023 109 863.2 filed on Apr. 19, 2023, which is incorporated herein by reference in its entirety.

TECHNICAL FIELD

The invention relates to a functional layer for a vehicle window including a first backing film having a preferably segmented first electrically conductive coating, a second backing film having a second electrically conductive coating, and a liquid crystal array disposed between the two electrically conductive coatings. Furthermore, the invention relates to a method for in particular electrically contacting a functional layer which is used in a vehicle window.

BACKGROUND

A vehicle window having an assembly for variable optical transmission in which a functional layer is used is known from the prior art and is, for example, a roof element configured to be movable or also fixed relative to a vehicle structure. The vehicle window is a composite component that has an outer window body and an inner window body. The outer window body forms an outer visible surface of the vehicle window, and the inner window body forms an inner visible surface of the vehicle window. Between the outer window body and the inner window body, the functional layer is provided as a PDLC (polymer-dispersed liquid crystal), SPD (suspended particle device), EC (electrochromic) or LC (liquid crystal) array, by means of which the entry of light through the vehicle window can be controlled. The assembly for variable optical transmission can be switched between a blocking state, in which it acts in the manner of a diffuser, and a transmission state, in which light can pass through the vehicle window essentially unscattered.

The assembly for variable optical transmission typically comprises two plastic films, on the inside of each of which a transparent, conductive coating is formed, and a variable layer disposed between the plastic films, which can be switched between the blocking state and the transmission state by applying corresponding voltages. The conductive coatings of the plastic films each form an electrode layer, which can be connected to a control device and/or a voltage source by means of appropriate electrical contacting. The electrical contacting of the electrode layers takes place in particular at the lateral edges of the assembly for variable optical transmission.

In order to enable a roller blind effect and/or partial shading of the vehicle window in question using such an assembly for variable optical transmission, it is preferred for the PDLC layer and the electrically conductive coatings to be segmented in order to be able to control individual segments of the assembly for variable optical transmission independently of each other and to switch back and forth between the blocking state and the transmission state. The individual segments increase the manufacturing effort required to provide a respective contacting.

In order to be able to realize the contacting, the corresponding electrically conductive coating has to be at least partially exposed in the edge areas. This exposure is known as a kiss cut. Residue-free exposure of the electrically conduc-tive coating of the plastic films of the assembly for variable optical transmission is currently only possible by subjecting the electrically conductive coating in ques-tion to mechanical processing, which can impair and/or damage the coating quality.

After the electrically conductive coating has been exposed and/or after the PDLC polymer remaining on the electrically conductive coating has been cleaned off, a tin busbar is usually applied by soldering or welding in the prior art to provide the electrical contacting of the individual segments. This tin busbar is placed on the electrically conductive coating as a function of the respective positions and/or locations of the respective PDLC segments in order to be able to contact the individual PDLC segments or the individual segments of the electrically conductive coating segment by segment and thereby energize them. Furthermore, one wire per PDLC segment is inserted into the surrounding hot-melt adhesive and one end of each wire is soldered to the previously applied tin busbar using additional solder. The second end of each wire is also soldered to a connector, such as a flexible printed circuit board (FPCB), using additional solder. The connector is then positioned in such a manner that it is placed in an edge area of the vehicle window during subsequent use and can be connected to a voltage source and/or a control device.

The two electrically conductive coatings are contacted on both sides of the functional layer in order to electrically contact both electrodes.

SUMMARY

This known process for providing the contacts has a number of disadvantages.

For example, when soldering or welding, applying the solder segment by segment is slow, which means several soldering stations working in parallel are required to increase the production speed. This leads to an increase in capital costs and operating costs. In addition, the low flexibility of the solder can lead to the solder coming off in the further course of the process if, for example, the assembly for variable optical transmission has to be curved and/or moved in the further course of production. In addition, the soldered-on tin busbar can act as a barrier to the venting of the film composite in the further course of the process due to the material application, which can, among other things, cause bubbles to form within the composite layer. This in turn leads to optical imperfections in the vehicle window.

Contacting the individual segments with wires also has several disadvantages. For example, a (single) wire has to be inserted and/or embedded in a surrounding hot-melt adhesive for each PDLC segment, which requires high-precision work. In addition, the speed of the insertion process is limited. To increase this speed, several tool heads have to be used, which increases capital and operating costs. In addition, it is not possible to insert wires in parallel, which means that several tool heads are required at different work stations. A defect in a wire also leads to the destruction of the entire film composite, as a result of which the entire vehicle window ultimately has to be replaced in the case of an assembled vehicle window in order to restore its function. Also, the contact points of the wires to the tin busbar are located along the entire exposed area of the assembly for variable optical transmission, as each PDLC segment must be contacted with a wire. This increases the required width of the area to be exposed, which means that a small functional area is available for the assembly for variable optical transmission. Also, each wire has to be soldered at two soldering points, which further increases the manufacturing effort. As described, the known contacting concepts lead to a reduction of the see-through area at least in one direction of expansion (in the direction of the applied contact elements for PDLC contacting) of the assembly for variable optical transmission.

The disadvantages mentioned above are to be overcome.

In the light of this, an object of the invention is to enhance a functional layer for a vehicle window in such a manner that manufacturing efficiency is improved compared to the prior art and/or the susceptibility to defects of a subsequent assembly for variable optical transmission due to a lack of contact is at least reduced. Also, an object of the invention is to provide a method for contacting a functional layer used in a vehicle window and/or an assembly for variable optical transmission whose manufacturing efficiency is improved compared to the prior art and/or which at least reduces a susceptibility to defects of a subsequent assembly for variable optical transmission due to a lack of contacting.

According to the invention, this object is attained by a functional layer characterized in that the first electrically conductive coating is exposed at least in a surface area and is removed at least in the exposed surface area to form at least one insulation area so as to form at least a first segment and a second segment of the first electrically conductive coating. The first segment is electrically insulated from the second segment by the at least one insulation area. At least one first electrically conductive conductor path extends from the first segment in the insulation area to a contact area configured to electrically contact the shading assembly. A first insulation layer is applied to the first electrically conductive conductor path, and at least one second electrically conductive conductor path, which is applied to the first insulation layer, extending from the second segment in the insulation area to the contact area.

Furthermore, the object is attained by a method for contacting a functional layer for use in a shading assembly, in particular an assembly for variable optical transmission, of a vehicle window, the method comprising the following steps: providing a processed functional layer comprising a first backing film having a preferably segmented first electrically conductive coating, a second backing film having a second electrically conductive coating, and a liquid crystal array disposed between the two electrically conductive coatings, the first electrically conductive coating being at least partially removed and/or stripped in a surface area to form at least one insulation area so as to form at least one exposed first segment and a second segment of the first electrically conductive coating; applying at least one first electrically conductive conductor path (36) in the insulation area in such a manner that the first electrically conductive conductor path extends from the first segment in the insulation area to a contact area; applying at least one first insulation layer to the first electrically conductive conductor path; and applying at least one second electrically conductive conductor path to the first insulation layer in such a manner that the second electrically conductive conductor path extends form the second segment to a contact area.

Advantageous embodiments of the invention include the following.

In the functional layer, the first backing film and/or the second backing film comprises a plastic material, preferably PET.

In the functional layer, the first electrically conductive coating and/or the second electrically conductive coating comprises an ITO layer.

In the functional layer, the first and/or the second electrically conductive conductor path is/are printed on and or applied by means of an electrically conductive ink and/or an electrically conductive paste and/or an electrically conductive paint.

In the functional layer, the contact area is connected to an electrical terminal of the shading assembly via at least one connecting conductor path, the electrical terminal allowing the second electrically conductive coating to be contacted, the at least one connecting conductor path being at least partially printed onto and/or applied to the second backing film.

In the functional layer, the second backing film includes the second electrically conductive coating and the liquid crystal array is stripped and/or removed in the exposed surface area.

In the functional layer, an edge seal is provided in an edge area of the exposed surface area, and the at least one connecting conductor path extends across the preferably step-shaped edge area.

In the functional layer, at least the first and/or the second electrically conductive conductor path widens into a contact point in the at least one contact area.

In the functional layer, the electrical contact area comprises a flexible printed circuit board, FPCB, configured to connect the shading assembly to a voltage source.

In the functional layer, the electrical terminal comprises a preferably metallic terminal clamp disposed on the second backing film and configured to contact the second electrically conductive coating.

In the functional layer, the first backing film, the first electrically conductive coating and the liquid crystal array are at least partially removed, in particular slit, in a terminal area, the terminal clamp preferably being connected to the second backing film in a force-fitting and/or form-fitting manner and thus contacts the second electrically conductive coating.

In the functional layer, the first insulation layer comprises a dielectric layer and is configured to electrically insulate the first electrically conductive conductor path from the second electrically conductive conductor path.

A shading assembly, in particular an assembly for variable optical transmission, can include a functional layer as described above.

A vehicle window can include a shading assembly as described above.

All combinations of at least two features disclosed in the description, the claims and/or the figures fall within the scope of the invention. In particular, linguistically common rephrasing and/or an analogous replacement of terms within the scope of customary linguistic practice, in particular the use of synonyms supported by the generally recognized linguistic literature, are of course comprised by the present disclosure without being explicitly mentioned in their respective formulations.

The invention proposes a functional layer for use in a shading assembly, in particular an assembly for variable optical transmission, of a vehicle window. The functional layer is in particular a PDLC (polymer dispersed liquid crystal), SPD (suspended particle device), EC (electrochromic) or LC (liquid crystal) arrangement. The functional layer comprises a first backing film having a preferably segmented first electrically conductive coating. The functional layer comprises a second backing film having a second electrically conductive coating and a prefer-ably segmented liquid crystal array disposed between the two electrically conductive coatings. The liquid crystal array can comprise a PDLC (polymer dispersed liquid crystal) array, a SPD (suspended particle device) array, EC (electrochromic) or a LC (liquid crystal) array. The first electrically conductive coating is exposed at least in a surface area and is and is removed at least in the exposed surface area to form at least one insulation area so as to form at least a first segment and a second segment of the first electrically conductive coating. The at least one insulation area electrically insulates the first segment from the second segment. At least one first electrically conductive conductor path extends from the first segment in the insulation area or within the insulation area to a contact area, which is formed for electrical contacting of the shading assembly. The contact area is preferably formed in the exposed surface area, preferably in an edge area and/or a corner area. A first insulation layer is applied to at least part of the first electrically conductive conductor path, the electrically conductive conductor path preferably having an area in the contact area that is not covered by the first insulation layer, meaning that, for example, the first insulation layer has a recess. At least one second electrically conductive conductor path extends from the second segment in the insulation area and/or within the insulation area to the contact area. The second electrically conductive conductor path applied to at least part of the first insulation layer. Preferably, the second electrically conductive conductor path does not cover the contact area of the first electrically conductive conductor path, meaning there is no electrical connection between the first and second electrically conductive conductor paths.

The invention further proposes a method for contacting a functional layer for use in a shading assembly, in particular an assembly for variable optical transmission, of a vehicle window. The method comprises the following steps: In a first step, a processed functional layer is provided, the processed functional layer comprising a first backing film having a preferably segmented first electrically conductive coating, a second backing film having a preferably segmented second electrically conductive coating, and a preferably segmented liquid crystal array disposed between the two electrically conductive coatings. The first electrically conductive coating is at least partially removed and/or stripped in a surface area to form at least one insulation area so as to form at least a first segment and a second segment of the first electrically conductive coating, which are electrically insulated from each other. In a further step, at least one first electrically conductive conductor path is applied in particular at least partially in the insulation area or within the insulation area in such a manner that the electrically conductive conductor path extends from the first segment in the insulation area or within the insulation area to a contact area. The first electrically conductive conductor path and preferably all further conductor paths can preferably be exposed at least in the contact area. In a further step, at least one first insulation layer is applied to the first electrically conductive conductor path. The insulation layer does not have to completely cover the first electrically conductive conductor path. In a further step, at least one second electrically conductive conductor path is applied to the first insulation layer in such a manner that the second electrically conductive conductor path extends from the second segment to a contact area. So the first conductor path preferably extends from the first segment to or into the contact area and the second conductor path preferably extends from the second segment to or into the contact area. The insulation layer is applied between the conductor paths. If there are more than two segments, a conductor path extends from each segment to the contact area, an insulation layer being applied between every two conductor paths. In this manner, the conductor paths can be layered and/or stacked on top of each other with the aid of respective insulation layers. Nevertheless, each segment can be contacted by its individual conductor path. Due to this layering and/or stacking, the exposed surface area or edge area can be narrower compared to the prior art, so more functional area is available for the assembly for variable optical transmission. Furthermore, it is advantageous that the insulation area for the electrical insulation of the individual segments can be narrower since the conductor paths are no longer disposed next to each other in the insulation area.

So the invention proposes a method for contacting a functional layer used in a vehicle window and/or in an assembly for variable optical transmission. In its intended use, the functional layer is used in an assembly for variable optical transmission, which in turn is used in a vehicle window to provide a shading function and/or a roller blind function. Although the present invention is de-scribed for an assembly for variable optical transmission, this is not to be understood in a restrictive manner, meaning all embodiments and/or descriptions should also be read as also relating to an LC array, unless technically excluded.

The conductor paths and the insulation layers are preferably applied one after the other. The conductor paths each preferably extend within the insulation area from one segment into the contact area without touching and/or contacting another segment. The individual segments of the first segmented, electrically conductive coating are each electrically contacted by the conductor paths and guided to the contact area. It is understood that the first segmented, electrically conductive coating and the second preferably segmented, electrically conductive coating and the segmented PDLC layer disposed therebetween can each have segments corresponding to one another, meaning the individual segments of the first segmented, electrically conductive coating and/or the second segmented, electrically conductive coating and/or the segmented PDLC layer disposed therebetween do not overlap.

It is understood that further segments may also be present. It is also understood that the first electrically conductive coating does not have to be removed completely according to the invention, but that only part of the first electrically conductive coating may be removed. The first and/or the second segment can, for example, also comprise a course of the conductor path applied later but be electrically insulated from one another. In this case, the conductor path is applied to the first electrically conductive coating. The path along which the conductor path in question is to be applied therefore does not necessarily have to be removed from the first electrically conductive coating according to the invention but can remain, such a segment being electrically insulated from another segment by the first insulation layer. Particularly preferably, the first electrically conductive conductor path is applied to the insulation area and/or at least partially to the first electrically conductive coating. It is also understood that the first and/or the second coating does/do not necessarily have to be (pre-) segmented, but that the first and/or the second coating can also be segmented before being provided. The second coating does not necessarily have to be segmented. It is merely advantageous for one of the two coatings to be segmented so that the roller blind function and/or the segment-by-segment switching of the film can be implemented.

So the invention relates to a contacting solution for the electrical connection and/or contacting of a preferably already pre-segmented functional layer in order to be able to energize it segment by segment in its intended use. The segmentation of the functional layer is optional or necessary, depending on its type, for example whether it is based on PDLC, LC, SPD. In this manner, an assembly for variable optical transmission which can be switched and/or energized segment by segment when in use can be formed with a functional layer contacted according to the method. Thus, a roller blind function can be provided, for example.

The exposure of the first segmented, electrically conductive coating at least in a surface area can preferably be provided in any manner. For example, the surface area can be provided by cutting the second backing film including an underlying PDLC layer (which is also generally referred to as a kiss cut). Any residues of the PDLC layer on the segmented first electrically conductive coating can then be removed by cleaning. In the exposed surface area, the second backing film is preferably stripped and/or removed including the second electrically conductive coating and the liquid crystal array.

According to the invention, the first segmented, electrically conductive coating is at least partially decoated in order to form the insulation area so that the segment-by-segment energization of the individual segments can ultimately be implemented. The first and the second backing film preferably comprise PET. The first segmented, electrically conductive coating and/or the second segmented, electrically conductive coating preferably comprises indium tin oxide (ITO). Other preferably transparent electrically conductive coatings can also be used.

So the invention relates to a space-optimized and/or space-saving contacting solution for electrically contacting the individual PDLC segments in particular by means of printed, preferably digitally printed conductor paths and interposed, in particular dielectric, insulation layers. The invention enables the contacting of all segments of the assembly for variable optical transmission by the, in particular alternating, application of conductive conductor paths and the insulation layer(s), which electrically insulate the conductor paths from each other. The insulation layers allow the conductor paths to be "stacked" on top of each other. The conductor paths are preferably cured alternately with the insulation layers using IPL (intense pulsed light). The insulation layers are preferably cured by applying UV light. By layering or stacking the conductor paths, a width of the exposed surface area or the kiss-cut area, which is a non-switchable area, can be greatly reduced. In particular, the exposed surface area can be reduced to the width of a (single) conductor path. Curing can also be carried out thermally and/or by means of a laser. This results in an increase in the see-through area or the switchable functional area without having to increase the dimensions of the assembly for variable optical transmission. Instead, according to the invention, a larger proportion of the assembly for variable optical transmission is available as a functional area compared to a non-functional area. Since the conductor paths are applied to a surface of the exposed surface area in particular in a manner defined by geometry, a preferred flexible printed circuit board (FPCB) can be connected directly or immediately to the assembly for variable optical transmission. This reduces the complexity.

The present invention offers the following advantages over the existing contacting solutions, among others. For example, the width of the exposed surface area can be reduced, which leads to an increase in the see-through area and/or the switchable functional area of the assembly for variable optical transmission. In addition, the contacting solution offers the potential for cost savings, as the assembly for variable optical transmission itself does not have to be enlarged to increase the see-through area or the functional area. Also, the contacts for each PDLC segment can be brought together at one position in the contact area. A simple connection to an FPCB is then possible at this position. In a preferred embodiment, the contacting solution according to the invention also enables the first and the second electrically conductive coating or electrode to be contacted from one side of the assembly for variable optical transmission, which reduces the complexity and/or the manufacturing effort. The contacted assembly for variable optical transmission or the functional layer according to the invention thus becomes an independently functioning (sub) system, which functions independently of any surrounding components of a SMART stack and/or can be provided for further use in a vehicle window.

In one embodiment, the first backing film and/or the second backing film comprise(s) a plastic material, preferably PET. In principle, other plastics and/or plastic mixtures are also conceivable and can be advantageous over PET depending on the application. For example, PEN (polyethylene naphthalate), ABS (acrylo-nitrile butadiene styrene), PC (polycarbonate) PL (polyester) and/or PI (polyimide) can also be considered. Particularly preferably, the first electrically conductive coating and/or the second electrically conductive coating comprise(s) an ITO layer.

In one embodiment, the insulation area of the first segmented, electrically conductive coating is formed by decoating using laser and/or etching using an etchant and/or by mechanical removal, in particular by means of a brush. The first coating can also be stripped abrasively. Stripping by laser or etching is advantageous due to the achievable structural accuracy. Mechanical stripping, e.g., by means of a rotating brush, on the other hand, is cost-effective. In principle, mechanical stripping can also be achieved by scratching with a knife. This is a particularly simple manner of insulating individual segments and requires a simple manufacturing set-up. For example, a $CO_2$ laser can also be used for removal. The laser is preferably operated in continuous wave mode but can also be operated in pulsed mode, in principle. The laser power is preferably from 100 W to 500 W, particularly preferably from 200 W to 300 W. For decoating, the laser beam is preferably focused on the first segmented, electrically conductive coating, which ensures a high power density and a thin cutting line.

In one embodiment, the first and/or the second electrically conductive conductor path (and/or also further conductor paths) is/are printed by means of an electrically conductive ink and/or an electrically conductive paint and/or an electrically conductive paste and/or otherwise applied and/or vapor-deposited. The application of electrically conductive conductor paths thus preferably comprises a printing of the at least one insulation area and/or also partially of the first electrically conductive coating with an electrically conductive paint and/or ink and/or an application of an electrically conductive paste and/or ink. Particularly preferably, such an ink and/or paint and/or paste comprises a high flexibility and a special suitability for printing on, for example, PET or on, for example, coated PET substrates by means of ITO or on other preferably flexible substrates. As a result, the printed and/or applied conductor paths are not damaged or impaired during further production and/or further production steps of the functional layer even when it is bent and/or curved. It may be preferable to use at least one stencil and/or a print mask during printing and/or application and/or to use a digital printing process. This allows a structured and predefined shape of the conductor paths to be achieved. In addition, the conductor paths can also follow complex lines. In one embodiment, the second conductor path preferably follows the first conductor path at least in one section of the path, meaning the conductor paths preferably at least partially have a congruent or similar (±10%) course. The conductor paths are thus guided to the in particular common contact area, which is preferably disposed at an end region of the exposed surface area, with respective insulation layers in between. The contact area preferably also serves as an electrical contact for the second electrically conductive coating.

In one embodiment, the contact area is connected via at least one connecting conductor path to an electrical terminal or contact point of the shading assembly, through which the second electrically conductive layer can be contacted. The at least one connecting conductor path is at least partially printed onto and/or applied to the second backing film. In other words, the contact area is preferably applied and/or connected to an electrical terminal of the shading assembly in such a manner that the second electrically conductive coating is contacted. The at least one connecting conductor path is at least partially printed onto and/or applied to the second backing film in the process. The connecting conductor path establishes an in particular common contact to the other electrode or the second electrically conductive coating of the functional layer. So the second electrically conductive coating preferably does not have to be contacted segment by segment but can be guided into the contact area via an electrical terminal or an electrical connection through the connecting conductor path. This saves labor because, unlike in the prior art, there is no need to contact the second electrically conductive coating from the other side of the assembly for variable optical transmission including partial decoating and/or kiss-cut exposure. This is particularly preferable since the second coating can be contacted from the same side of the functional layer, meaning the functional layer does not necessarily have to be turned during production. The second electrically conductive coating can preferably also be contacted in the case described. For this purpose, a kiss cut can preferably also be produced from the second side and/or the remaining material and/or polymer can be cleaned from the second electrically conductive coating. The advantage is that the electrically conductive connecting element and the conductor path can be used to realize a combined contacting of both electrically conductive coatings at one position. In order to be able to implement the kiss cut on the second side, turning is particularly preferably carried out in one production step. Further contact can preferably be made from one side or on one side after the electrical connection element has been attached.

The electrical terminal is preferably an electrically conductive metallic connecting element which is disposed on the second backing film and configured to contact the second electrically conductive coating.

In one embodiment, an edge seal is provided in an edge area of the exposed surface area. The at least one connecting conductor path preferably extends beyond the preferably step-shaped edge area into the contact area in order to lead the electrode formed by the second coating to a common terminal point. The connecting conductor path is preferably printed over the edge seal, meaning edge seal is provided before the connecting conductor path is applied. In the event that the connecting conductor path is printed on, a print head is preferably able to print the connecting conductor path in the step-shaped edge area in order to guide it into the contact area uninterrupted, if possible. In one embodiment, at least one of the at least one connecting conductor path can extend beyond the edge area. In principle, the connecting conductor path can also be contacted in an in particular flat area of the second backing film, meaning the at least one connecting conductor path does not necessarily have to cross the edge area. The edge area is preferably to be understood as a kiss-cut edge.

In one embodiment, at least the first and/or the second electrically conductive conductor path each widen into at least one contact point in the at least one contact area. In the contact point, preferably all or at least one of the conductor paths can widen in order to enable improved contacting. This can enable a connection to an external electrical terminal, for example an FPCB. For this purpose, the electrical contact area preferably comprises a flexible printed circuit board, FPCB, through which the shading assembly can be connected to an, in particular external, voltage source. The contact area can preferably be contacted with the flexible printed circuit board, FPCB, in order to be able to control all segments collectively. The contact in the contact area can be produced in a form-fitting, force-fitting and/or bonded manner. For example, the contact can be produced by an adhesive connection and/or by a crimp connection and/or by a welded connection and/or by a soldered connection and/or by a clamped connection, etc. The voltage source can be provided in an immediate periphery of the shading assembly or can be located in another area of the vehicle. In other words, an in particular flexible power supply cable and/or an in particular flexible connector is preferably connected to the respective conductor paths in the contact area, in particular individually or collectively, by welding, in particular by ultrasonic welding and/or by thermal welding and/or by soldering, ultrasonic soldering and/or by gluing and/or by clamping and/or by crimping. An FPCB is preferably welded to the printed contact points by ultrasonic welding. For example, a plug-in and/or clamp connection can be provided for the electrical connection between the contact area and an electrical line, such as a cable, meaning the contact area itself or another component that is disposed on the contact area is configured accordingly.

In one embodiment, the electrical terminal comprises a preferably metallic terminal clamp disposed on the second backing film and configured to contact the second electrically conductive coating. The first backing film, the first electrically conductive coating and the liquid crystal array are at least partially removed, in particular slit, in a terminal area. The terminal clamp is preferably force-fitted to the second backing film, whereby the second electrically conductive coating is contacted. The terminal clamp can be U-shaped and comprise two legs, for example. The terminal clamp is preferably made of a metallic material. The terminal clamp is preferably configured to contact the second electrically conductive coating in the terminal area with a first leg, in particular by means of com-pressive force, and to contact the connecting conductor path with the second leg, in particular by means of compressive force. In one embodiment, a form-fitting and/or bonded connection of the terminal clamp is alternatively or additionally provided.

In one embodiment, the first insulation layer comprises a dielectric layer and is configured to electrically insulate the first electrically conductive conductor path from the second electrically conductive conductor path. The first insulation layer and preferably also each further insulation layer is/are dimensioned at least as large and/or wide as the first and/or the second conductor path. Particularly preferably, the first insulation layer overlaps the first and/or the second conductor path in a conductor path width in order to enable the most complete insulation possible. The insulation layer comprises, for example, a polymer, such as polyamide, epoxy resin, barium titanate, a carbonaceous material and/or a fluoropolymer material.

In one embodiment, the electrically conductive conductor paths and/or the insulation layers are flexible after printing. This has the advantage over the prior art that even if the functional layer is bent, a conductor path does not become detached, which would otherwise possibly cause damage to the PDLC contact.

In one embodiment, the electrically conductive conductor paths are pre-dried, in particular by intense pulsed light (IPL), after application. Pre-drying can also be carried out using a laser or thermally using hot air and/or infrared and/or an oven and/or UV radiation. The optional pre-drying of the ink and/or the paint and/or the paste is carried out in order to achieve improved handling resistance. IPL has the advantage of a short cycle time, as only a short energy input time is required. Compared to thermal drying, only a few seconds, for example 10 to 30 s, are required, whereas thermal drying is expected to require a cycle time of approx. 2 to 30 min. Pre-drying and possibly post-drying, in particular in an autoclave, can have a positive effect on the production time and/or the cycle time. Alternatively, post-drying or post-curing and/or through-drying is possible.

In one embodiment, at least the following steps are carried out to provide the processed functional layer: heating the functional layer on the side of the first backing film; and removing a defined area of the second backing film together with a section of the PDLC layer adhering in this area from the first backing film so that the first conductive coating of the first backing film is preferably exposed without residues of the PDLC layer in a surface area corresponding to the removed area of the second backing film. The first conductive coating is preferably freed from the PDLC layer without leaving any residue.

It has been shown that by heating the functional layer on one or both sides, the other side of the functional layer can be separated as a unit with functional material (PDLC (polymer dispersed liquid crystal), SPD (suspended particle device), EC (electrochromic) or LC (liquid crystal)) due to the reduced adhesion forces between the functional material and the conductive coating of the first backing film. The cohesive forces of the functional material, in particular as a layer and/or as a film, and the adhesive forces between the functional material and the electrically conductive coating of the second backing film are preferably retained. This makes it possible to remove the functional material from the electrically conductive coating of the first backing film without damaging the electrically conductive coating. The removal process can be carried out quickly and with a high level of work safety, as no solvents need to be used. A high level of reproducibility is also guaranteed. The defined area of the second backing film is reproducible, meaning rapid industrial implementation of the method according to the invention is also possible.

The functional layer is, for example, a blank cut of a film composite, which is composed of the first backing film with the first electrically conductive coating, the second backing film with the second electrically conductive coating and the PDLC layer disposed in between. The cutting of the functional layer can be integrated into the method according to the invention.

After carrying out the preferred method, the resulting functional layer processed in this manner can be further processed according to the invention. The exposed conductive coating of the first backing film can be contacted in accordance with the invention so that it can be connected to a control unit, and the assembly for variable optical transmission can be integrated into the composite structure of a vehicle window in such a manner that it is disposed between two window bodies, for example. The composite structure of the vehicle window can comprise further plastic films and/or layers disposed on one or more window bodies and/or comprise ambient light functionality. For example, at least one hot-melt adhesive film and/or a functional coating, such as for reflecting or absorbing light of a certain wavelength, is disposed between an outer window body and/or between an inner window body and the first or the second backing film.

The assembly for variable optical transmission of the manufactured vehicle window forms in particular a shading assembly which can be switched between a blocking state and a transmission state by applying corresponding electrical voltages by means of the connected electrical control system. In particular, the vehicle window formed in this manner is suitable as a window of a vehicle roof, which can be a part of a fixed roof element disposed rigidly in relation to a vehicle structure or part of a roof element which can be moved in relation to the vehicle structure by means of corresponding drive kinematics.

At least one of the two electrically conductive coatings of the two backing films of the functional layer is segmented according to the invention, separate contacting of the segments of the electrically conductive coating in question being possible using the method according to the invention.

In a special embodiment of the method according to the invention, the functional layer is heated on the side of the first backing film in such a manner that the first backing film assumes a temperature of 60° C. to 220° C., in particular a temperature of 60° C. to 150° C. and preferably a temperature of 60° C. to 100° C. These temperature ranges are suitable in particular when using a PET film as a backing film, the melting temperature of which is around 260° C.

In the preferred method, no mechanical processing of the exposed electrically conductive coating is required, so it is free of solvents and also free of traces of cleaning.

In a special embodiment, the defined area of the second backing film is removed together with the section of the PDLC layer adhering in this area using a separating tool. The separating tool is preferably applied to the structure of the function-al layer without contact to the electrically conductive coating of the first backing film.

In order to clearly define the area in which the second backing film is detached from the first backing film together with the section of the PDLC layer adhering in this area, the defined area is produced by cutting through the second backing film along a cutting line without the first backing film and its electrically conductive coating being mechanically processed, i.e., without the first backing film being affected by the cutting process, in a preferred embodiment of the method. This type of cutting process is often referred to as a kiss cut or half cut.

The defined area in which the electrically conductive coating of the first backing film is exposed by means of the method according to the invention can have a strip shape, an L-shape, a U-shape or a frame shape. It is also conceivable that the defined area is formed by a local surface section, which can have any geometry. According to the invention, each of these geometric shapes can be minimized to the width of a conductor path.

In a special embodiment, the functional layer is held outside the defined area when it is detached by means of a hold-down device in order to support the detachment of the second backing film and the section of the PDLC layer adhering to it from the first backing film.

In a particular embodiment, the functional layer is cooled on the side of the second backing film during the detachment of the defined area of the second backing film to further support the detachment process and to ensure the adhesion forces between the PDLC mass or layer and the electrically conductive coating of the second backing film.

A shading assembly, in particular an assembly for variable optical transmission, which comprises a functional layer according to the invention is particularly preferred. The shading assembly is preferably provided for providing a shading function for a vehicle.

A vehicle window with a shading assembly is also preferred. This can basically be any vehicle window. Preferably, it can be a windshield and/or a rear window and/or a side window and/or an openable and/or non-openable vehicle roof window, such as a sliding roof or a panoramic roof. The vehicle can be a commercial vehicle and/or a passenger vehicle and/or a truck and/or a transportation vehicle.

Further advantages and advantageous embodiments of the object of the invention are apparent from the description, the drawing and the claims.

BRIEF DESCRIPTION OF DRAWINGS

An embodiment of a method according to the invention is explained in more detail below with reference to the drawing.

DETAILED DESCRIPTION

Figure 1:
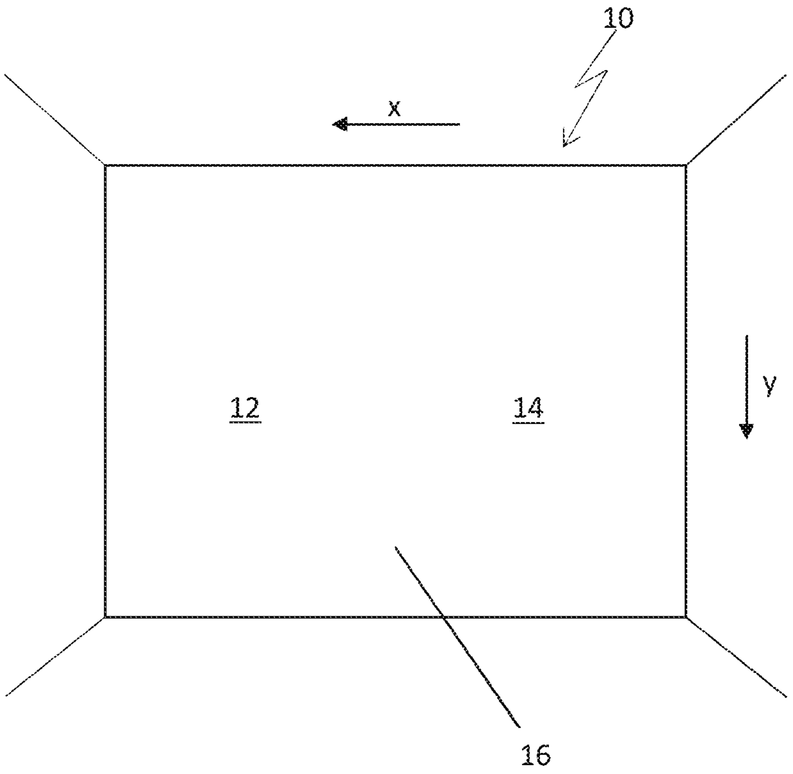
FIG. 1 is a schematic view of a roof area of a motor vehicle.

FIG. 1 shows a motor vehicle 10 comprising a vehicle roof 12, which is provided with a fixed roof element 14, which is rigidly or immovably attached to a vehicle body. The fixed roof element 14 forms a vehicle window, which is provided with a shading function, meaning the incidence of light into an interior of the motor vehicle 10 via the fixed roof element can be controlled. The vehicle roof 12 extends along a longitudinal vehicle direction x and a vehicle width direction y. The longitudinal vehicle direction x is orthogonal to the vehicle width direction y.

Figure 2:
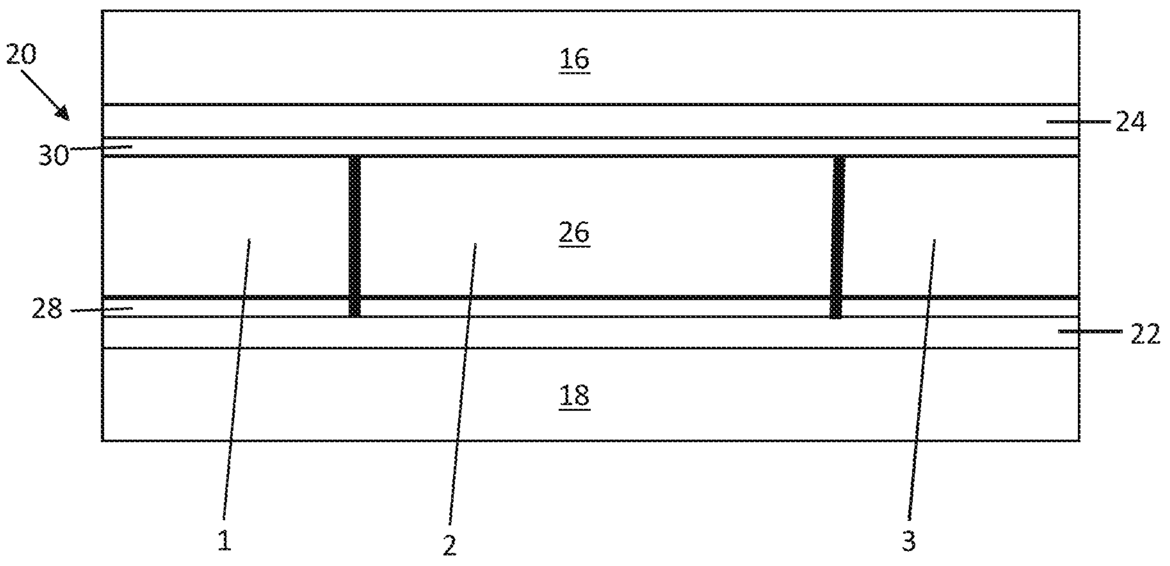
FIG. 2 is a sectional view of a window of the vehicle roof.

The fixed roof element 14 has a composite structure, which can be seen schematically in FIG. 2 and which comprises an outer window body 16, which forms an outer visible surface of the fixed roof element 14 facing the vehicle environment, and an inner window body 18, which forms an inner visible surface of the fixed roof element 14 accessible from the vehicle interior. An assembly for variable optical transmission 20, which constitutes a shading system of the fixed roof element 14, is disposed between the outer window body 16 and the inner window body 18. The assembly for variable optical transmission 20 comprises, for example, a PDLC array (polymer-dispersed liquid crystal array). The assembly for variable optical transmission 20 is connected to the outer window body 16 and the inner window body 18 via adhesive layers (not shown) comprising PVB (polyvinyl butyral).

Figure 3:
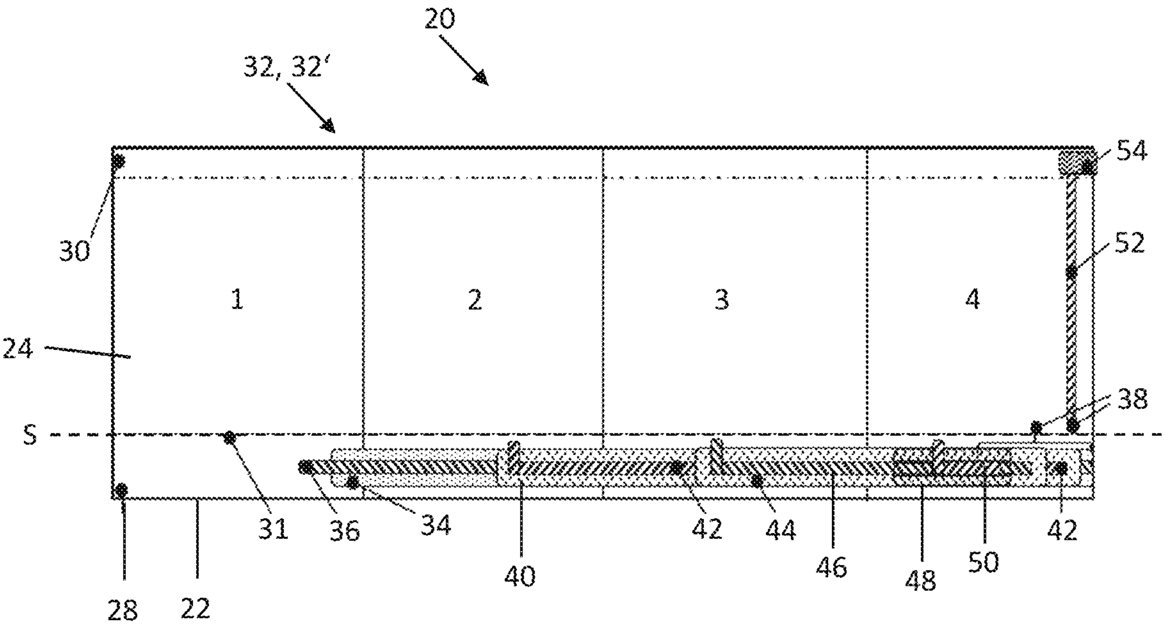
FIG. 3 is a schematic view of a functional layer according to the invention.

The assembly for variable optical transmission 20 comprises a first backing film 22 and a second backing film 24. Between the two backing films 22 and 24, a segmented liquid crystal array, in particular PDLC layer 26, or a PDLC mass is disposed, which forms the functionally effective element of the assembly for variable optical transmission 20. The segmentation of the liquid crystal array is optional when PDLC is used and can accordingly also be unsegmented in another embodiment example. The backing films 22 and 24, which can each be formed from a material such as PET or the like, each have an electrically conductive, in particular transparent coating 28 or 30 on their side facing the PDLC layer 26, transparent coatings 28 and 30 each forming an electrode layer and being formed by an ITO (indium tin oxide) coating in the case at hand. The first electrically conductive coating 28 is segmented in the present case. The second electrically conductive coating can also be segmented. It is also conceivable that both electrical coatings are segmented. Further electrically conductive coatings are also conceivable. The segmentation of the first electrically conductive coating 28 and, if applicable, of the PDLC layer 26 is indicated by vertical lines in FIG. 2. The segmentation can be carried out, for example, by removing the first electrically conductive coating 28 and/or by cutting through the PDLC layer 26 with a laser. For example, a CO2 laser, which has been described in more detail above, or mechanical cutting can be used. In FIG. 2, a total of three segments 1, 2, 3 can be seen, the designation by the respective reference signs being provided only once for reasons of clarity. FIG. 3, on the other hand, shows four segments 1, 2, 3, 4. The segmentation of the first electrically conductive coating 28 corresponds to the potential segments of the PDLC layer 26, each segment of the first electrically conductive coating 28 being associated with a potential segment of the PDLC layer 26. Since the potential segmentation of the PDLC layer 26 is optional relative to the segmentation of the first electrically conductive coating 28, the segments are referred to as 1 to n below.

By applying a first potential to the segmented, electrically conductive coating 28 and a second potential, which is different from the first potential, to the electrically conductive coating 30, a voltage can be applied to the likewise preferably segmented PDLC layer 26 by means of a control device (not shown) so that the optical transmission behavior of the PDLC layer 26 can be changed in the areas corresponding to the segments at which the electrical voltage is applied. Preferably, the first potential and/or the second potential is an alternating potential. This means that each individual segment 1, 2, 3, 4 of the PDLC layer 26 or the assembly for variable optical transmission 20 can be switched between a blocking state, in which the relevant segment 1, 2, 3, 4 of the PDLC layer 26 strongly scatters light due to the non-directional liquid crystals, and a transmission state, in which the relevant segment 1, 2, 3, 4 of the PDLC layer 26 is optically transmissive, allowing parts of the light to enter the vehicle interior predominantly unscattered through the vehicle window. The PDLC layer 26 forms the actual shading assembly and comprises a polymer matrix in which liquid crystals are integrated in droplet form.

To enable the individual PDLC segments 1, 2, 3, 4 to be energized and/or con-trolled, they must be electrically contacted or a voltage field must be applied accordingly. As an example, the first backing film 22 of the assembly for variable optical transmission 20 has a greater width in the vehicle width direction y of the fixed roof element 14 than the second backing film 24, meaning a surface area 31 (see an exemplary section of such a surface area 31 in FIG. 3) of the first backing film 22 is exposed in each lateral edge area. According to the invention, the first segmented, electrically conductive coating 28 can be contacted segment by segment or connected to the control device and/or the power supply (not shown) via a flexible connector, such as an FPCB (flexible printed circuit board), via these exposed surface areas 31.

When manufacturing the assembly for variable optical transmission 20 or preparing it for contacting and laminating it into the composite structure shown in FIG. 2, a functional layer 32 is preferably provided first. The functional layer 32 preferably has the dimensions that the first backing film 22 has in the installation position of the assembly for variable optical transmission 20. A so-called kiss-cut process is then preferably carried out on the functional layer 32, in which the second backing film 24 is cut along a cutting line S without the cutting process resulting in mechanical stress on the first backing film 22 and the coating 28.

The functional layer 32 is then heated, preferably on the side of the first backing film 22, so that the first backing film assumes a temperature of approximately 80° C. to 100° C. By means of an appropriate separating tool (not shown), the area defined by the cutting line S including the section of the PDLC layer 26 adhering to the second backing film 24 in this area can be detached from the first backing film 22 and its coating 28, in particular without leaving any residue, resulting in the exposed surface area 31 of the coating 28 of the first backing film 22 in the edge area.

Figure 4:
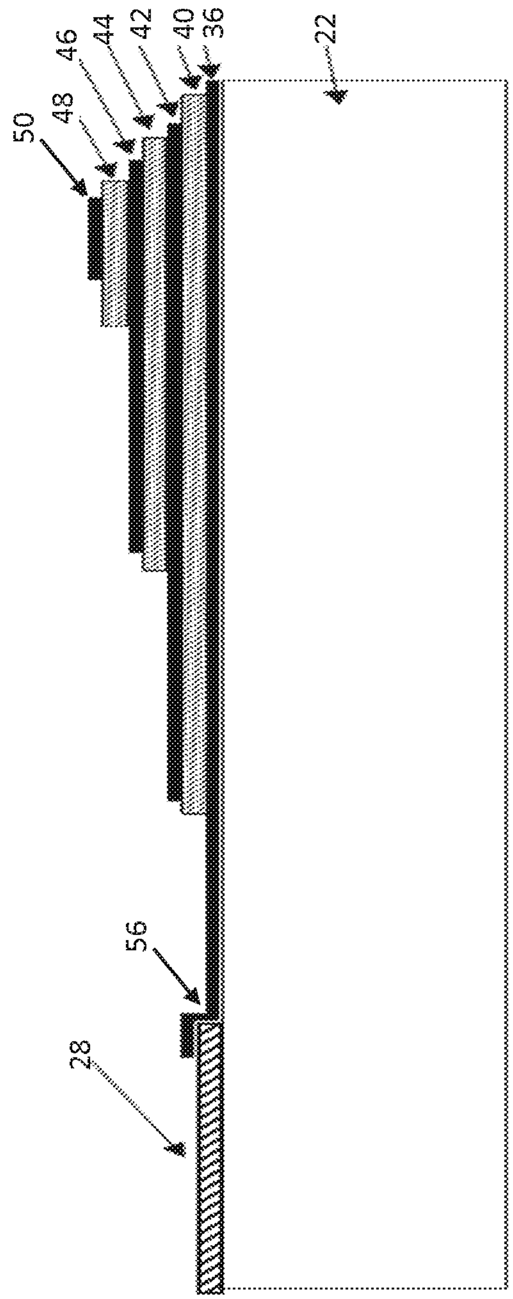
FIG. 4 is a schematic sectional view of a functional layer according to the invention.

FIGS. 3 and 4 show the contacting of the functional layer 32' processed in this manner including the at least one exposed surface area 31 in more detail. In FIG. 3, the second backing film 24 is transparent, so the underlying segmented, electrically conductive coating 30 can also be seen in the non-exposed area of the functional layer 32'. Even if segmentation has already taken place, the segmented, electrically conductive coating 28 can optionally be removed at least partially at least in the exposed surface area 31 to form at least one insulation area 34, by means of which the individual segments 1, 2, 3, 4 of the first segmented, electrically conductive coating 28 are electrically insulated from one another. The at least partial removal of the first segmented, electrically conductive coating 28 preferably comprises decoating by a laser and/or etching by an etchant.

According to the invention, at least one first electrically conductive conductor path 36 extends from the first segment 1 in the insulation area 34 to a contact area 38, which is designed for electrical contacting of the shading assembly. The first conductor path 36 is, for example, printed onto the first backing film 22 in the insulation area 34 or applied in some other manner.

A first insulation layer 40 is applied or laminated or printed onto the first conductor path 36. The first insulation layer 40 is preferably dielectric and is wider than the first conductor path 36, see FIG. 3.

In order to electrically contact the second segment 2 and lead it into the contact area 38, a second electrically conductive conductor path 42 is applied to, in particular printed onto, the first insulation layer 40 in the insulation area 34. A second insulation layer 44 is applied to the second conductor path and insulates the second conductor path 42 from a third conductor path 46, which extends between the third segment 3 and the contact area 38 and which is applied to the second insulation layer 44. A third insulation layer 48 is applied to the third conductor path 46 and electrically insulates the third conductor path 46 from a fourth conductor path 50, which is applied to the third insulation layer 48. The fourth segment 4 is electrically contacted and connected to the contact area 38 by the fourth conductor path 50. The insulation layers 40, 44, 48 are preferably only partially applied to the conductor paths so that the respective conductor paths are electrically insulated from one another. This can be seen in particular in FIG. 4.

Via at least one connecting conductor path 52, the contact area 38 is connected to an electrical terminal 54 of the shading assembly, via which the second electrically conductive layer 30 is contacted. The at least one connecting conductor path 52 is at least partially printed and/or applied to the second backing film 24.

It can be seen from the sectional view in FIG. 4 that the first conductor path 36 extends, for example, over an edge area 56 between the first electrically conductive coating 28 and the insulation area 34 and is therefore applied in the form of a step in the edge area 56. This may also apply to the contacting of the other segments 2, 3, 4, although this is not clear from the sectional view.

REFERENCE SIGNS

1 segment
2 segment
3 segment
4 segment
10 motor vehicle
12 vehicle roof
14 fixed roof element
16 outer window body
18 inner window body
20 assembly for variable optical transmission
22 first backing film
24 second backing film
26 PDLC layer
28 first coating
30 second coating
31 surface area
32 functional layer
32' processed functional layer
34 insulation area
36 first conductor path
38 contact area
40 first insulation layer
42 second conductor path
44 second insulation layer
46 third conductor path
48 third insulation layer
50 fourth conductor path
52 connecting conductor path
54 electrical terminal
56 edge area
x longitudinal vehicle direction
y vehicle width direction
S cutting line

The invention claimed is:

1. A functional layer for use in a shading assembly of a vehicle window, the functional layer comprising: a first backing film having a first electrically conductive coating, a second backing film having a second electrically conductive coating, and a liquid crystal array disposed between the two electrically conductive coatings, wherein the first electrically conductive coating is exposed at least in a surface area and is removed at least in the exposed surface area to form at least one insulation area so as to form at least a first segment and a second segment of the first electrically conductive coating, the first segment being electrically insulated from the second segment by the at least one insulation area, at least one first electrically conductive conductor path extending from the first segment in the insulation area to a contact area configured to electrically contact the shading assembly, a first insulation layer being applied to the first electrically conductive conductor path, and at least one second electrically conductive conductor path, which is applied to the first insulation layer, extending from the second segment in the insulation area to the contact area.

2. The functional layer according to claim 1, wherein the first backing film and/or the second backing film comprises a plastic material.

3. The functional layer according to claim 1, wherein the first electrically conductive coating and/or the second electrically conductive coating comprises an ITO layer.

4. The functional layer according to claim 1, wherein the first and/or the second electrically conductive conductor path (36, 42) is/are printed on and or applied by means of an electrically conductive ink and/or an electrically conductive paste and/or an electrically conductive paint.

5. The functional layer according to claim 1, wherein the contact area is connected to an electrical terminal of the shading assembly via at least one connecting conductor path, the electrical terminal allowing the second electrically conductive coating to be contacted, the at least one connecting conductor path being at least partially printed onto and/or applied to the second backing film.

6. The functional layer according to claim 5, wherein the electrical terminal comprises a terminal clamp disposed on the second backing film and configured to contact the second electrically conductive coating.

7. The functional layer according to claim 6, wherein the first backing film, the first electrically conductive coating and the liquid crystal array are at least partially removed in a terminal area, the terminal clamp being connected to the second backing film in a force-fitting and/or form-fitting manner and thus contacts the second electrically conductive coating.

8. The functional layer according to claim 6, wherein the first backing film, the first electrically conductive coating and the liquid crystal array are at least partially slit in a terminal area, the terminal clamp being connected to the second backing film in a force-fitting and/or form-fitting manner and thus contacts the second electrically conductive coating.

9. The functional layer according to claim 5, wherein the electrical terminal comprises a metallic terminal clamp disposed on the second backing film and configured to contact the second electrically conductive coating.

10. The functional layer according to claim 1, wherein the second backing film including the second electrically conductive coating and the liquid crystal array is stripped and/or removed in the exposed surface area.

11. The functional layer according to claim 10, wherein an edge seal is provided in an edge area of the exposed surface area, and the at least one connecting conductor path extends across the edge area.

12. The functional layer according to claim 10, wherein an edge seal is provided in a step-shaped edge area of the exposed surface area, and the at least one connecting conductor path extends across the step-shaped edge area.

13. The functional layer according to claim 1, wherein at least the first and/or the second electrically conductive conductor path widens into a contact point in the at least one contact area.

14. The functional layer according to claim 1, wherein the electrical contact area comprises a flexible printed circuit board, FPCB, configured to connect the shading assembly to a voltage source.

15. The functional layer according to claim 1, wherein the first insulation layer comprises a dielectric layer and is configured to electrically insulate the first electrically conductive conductor path from the second electrically conductive conductor path.

16. A shading assembly, comprising a functional layer according to claim 1.

17. A vehicle window comprising a shading assembly according to claim 16.

18. The functional layer according to claim 1, wherein the first backing film and/or the second backing film comprises PET.

19. A shading assembly for variable optical transmission, the shading assembly comprising a functional layer according to claim 1.

20. A method for contacting a functional layer for use in a shading assembly, the method comprising the following steps: providing a processed functional layer comprising a first backing film having a first electrically conductive coating, a second backing film having a second electrically conductive coating, and a liquid crystal array disposed between the two electrically conductive coatings, the first electrically conductive coating being at least partially removed and/or stripped in a surface area to form at least one insulation area so as to form at least one exposed first segment and a second segment of the first electrically conductive coating, applying at least one first electrically conductive conductor path in the insulation area in such a manner that the first electrically conductive conductor path) extends from the first segment in the insulation area to a contact area, applying at least one first insulation layer to the first electrically conductive conductor path, applying at least one second electrically conductive conductor path to the first insulation layer in such a manner that the second electrically conductive conductor path extends form the second segment to a contact area.

* * * * *